Patented June 29, 1926.

1,590,913

UNITED STATES PATENT OFFICE.

FRITZ SCHMIDT, OF DOBELN, GERMANY.

PROCESS FOR SOFTENING WATER.

No Drawing. Application filed October 21, 1925, Serial No. 63,989, and in Germany January 12, 1924.

The softening of water by utilizing caustic alkalies and alkali salts which exert a precipitating action upon dissolved calcium carbonate, magnesium carbonate and other calcium and magnesium compounds dissolved in water, is already known.

Alkali carbonate and alkali silicate have also already been added to soap for washing purposes, in order to economize soap, but this object has not been attained, or only very incompletely, as the salts causing hardness of the water have a tendency to interact first with the soap, forming inactive calcium and magnesium fatty acid salts which are insoluble in water and therefore do not form a lather. A softening of the water regulated according to scientific principles for washing purposes and for other household and minor technical purposes in general, has hitherto not been effected at all. Nevertheless by adequate softening of the water for such purposes in a simple manner and without elaborate apparatus a great deal could be saved, more particularly for the household, in the way of expensive soap, water, heating materials, work and time. The result of the work, in particular for washing, by utilizing softened water, is also considerably improved, and by reducing mechanical treatment the textile materials are saved from damage.

According to the present invention use is made in part of the means already known in science and technology for softening water. Besides caustic alkalies, by means of which the temporary carbonate hardness is removed, carbonates, borates and the like are employed in order to decompose the sulphates and chlorides of calcium and magnesium that are present in the water. Besides these softening media, however, a further medium is always utilized, which throws down as a flocculent precipitate all the calcium and magnesium compounds present in the water, namely silicates or aluminates or alumino-silicates of the alkalies, or mixtures thereof, that is to say, strongly dissociating alkali salts of acids insoluble in water, with a more or less great excess of caustic alkalies. The proportions of these constituents in the softening medium provides a compensation for the variability of the substances that give rise to the hardness of the water. Without having an exact analysis of the water it is still possible to work according to the approximately known degree of hardness of the water in such a way that a complete or almost complete softening including even the separation of the oxides of heavy metals (iron) is easily obtained. A small excess of the softening medium is no disadvantage.

Above all things, however, by employing in conjunction these alkali compounds such as silicate, aluminate and alumino-silicate, it is made possible to bring the softening medium into a form in which it can without hestitation be distributed to users.

Considerations based on sanitary regulations connected with the unrestricted distribution of strong caustic alkaline liquids for household purposes, are completely done away with, owing to the fact that it is possible, by using in conjunction alkali silicate, alkali aluminate and the like, with the addition if desired of clay, mucilaginous substances, casein and the like, to make pastes or solid masses in the form of cakes which can easily be divided and employed in the correct proportions according to directions for use.

Tap-water and spring water in Germany, apart from exceptional cases, have on an average from 10 to 15 degrees of hardness. As soon as the softening of the water for washing and other purposes has been more generally introduced, the public supervision of the degree of hardness of the water supply and regularly published information thereon, will be an obvious step to take. Simple instruction for use will then be sufficient to adapt the softening process to the differences in the hardness of the water. The user will soon learn to soften the water appropriately according to the action of the water on the skin of the hand as judged by the feel.

The new softening process may be carried out for example in the following manner:

One part of kaolin (clay) is suspended or made into a paste in 10 parts of water. Furthermore 40 parts of water, 6 parts of water-glass, (technically a solution of potassium or sodium silicate of the usual commercial strength of about 37 to 40 per cent Baumé and about 70 per cent silicic acid), 13 parts of a 40 per cent caustic soda lye, 10 parts of soda ash, and 18 parts of borax are mixed and dissolved. The two solutions are then poured one into the other and boiled. Of this liquid 100 grammes are used for softening 100 litres of water in the case of tapwater of average hardness. The softening medium is added and is left standing in the cold or warmed to about 40 to 60°. Silicic acid or silicate first separates out colloidally. Upon standing long enough or with sufficient warming and agitation flocculent precipitates are formed which bring about a rapid self-clarification.

The clarified water is ladled or decanted. If desired the sediment can be withdrawn and employed for scouring purposes.

For the manufacture of the softening medium in the form of paste or cakes, for example, 25 parts of water-glass technically and 11 parts of 40-degree caustic lye (soda or potash) are mixed with 20 parts of borax, 40 parts of calcined soda, and if desired 4 parts of sodium aluminate, with or without the addition of a certain amount of clay or mucilage solution. This is then heated and kneaded until it assumes the form of a stiff paste. The latter is moulded. The moulded pieces may be dried. In this form the softening medium forms a hygienically harmless, handy, salable and valuable article.

By the form of paste or cakes the softening medium is best guarded against the prejudicial actions of the carbonic acid of the atmosphere, and conversion of the caustic alkalies. Of course the dried softening medium may also be pulverized and placed on sale in airtight packages in a form convenient for storage, and easily soluble. The purification of a crude kind known in itself for the softening of water together with the addition of soap for washing purposes is fundamentally false and opposed to the basic idea of this invention, according to which the water is first softened and the soap then added to it, so as to be able to work with a maximum economy of soap and equivalent lathering means and the like and with the best success in washing.

Besides the purifying action a disinfecting action is also obtained or a more powerful solvent action for albuminous substances, fats, blood, vermin, micro-organisms and the like is obtained, a slight excess of the softening medium being advantageous.

Having now particularly described and ascertained the nature of my said invention and in what manner the same is to be performed, I declare that what I claim is:—

1. The process for softening water comprising simultaneously adding to water to be softened caustic alkali, carbonate, borates and an alkali compound which dissociates in water to form a flocculent precipitate in such proportions as to substantially soften the water and to cause only a limited hydrolysis of the alkali compound to form a quantity of flocculent precipitate sufficient to cause clarification of the treated water.

2. The process for softening water comprising simultaneously adding to water a relatively large proportion of caustic alkali sufficient in quantity to remove the temporary hardness of the water, a quantity of a salt capable of decomposing the salts which give permanent hardness to the water, and a quantity of an alkali salt which on hydrolysis yields a flocculent precipitate, said proportion of caustic alkali and last mentioned salt being such as to limit the formation of the flocculent precipitate and yet yield a flocculent precipitate in such a quantity as to precipitate the insoluble salts formed as the result of the softening reaction.

3. A water softening medium comprising alkali carbonate, borate and an alkali compound which alkali compound dissociates with water to form a flocculent precipitate, free caustic alkali, the proportion of said alkali compound and free caustic alkali being such as to cause only a limited hydrolysis, in the water to be treated, of the alkali compound to form a quantity of flocculent precipitate sufficient to cause clarification of the treated water and a binding medium for holding said mixture in a coherent mass.

In testimony whereof I have signed my name to this specification.

FRITZ SCHMIDT.